(No Model.)
J. JENKINS.
Grass Gathering Attachment for Lawn Mowers.
No. 233,516. Patented Oct. 19, 1880.
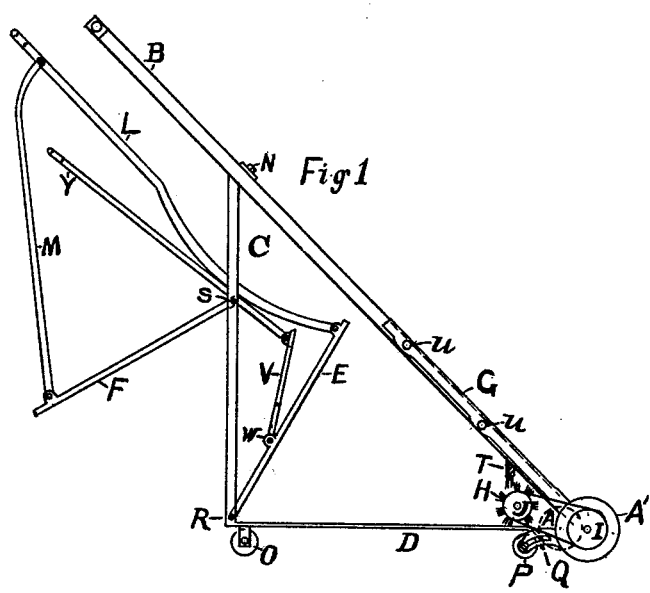
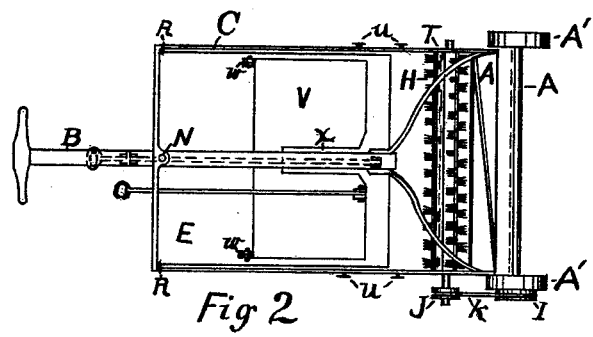
Witnesses:
Wm Zimmerman,
Fred. G. Zimmerman.
Inventor:
John Jenkins,
By Gridley & Co.,
Attys.

UNITED STATES PATENT OFFICE.

JOHN JENKINS, OF CHICAGO, ILLINOIS.

GRASS-GATHERING ATTACHMENT FOR LAWN-MOWERS.

SPECIFICATION forming part of Letters Patent No. 233,516, dated October 19, 1880.

Application filed August 31, 1880. (No model.)

*To all whom it may concern:*

Be it known that I, JOHN JENKINS, of Chicago, in the county of Cook and State of Illinois, have invented certain new and useful Improvements in Grass-Gathering Attachments to Lawn-Mowers; and I hereby declare the following to be a full, clear, and exact description thereof, which will enable others skilled in the art to which my invention appertains to make and use the same, reference being had to the accompanying drawings, forming a part hereof, and in which—

Figure 1 represents a side elevation of a lawn-mower with my attachment, with the front side removed; and Fig. 2 represents a plan view with the top or cover removed.

My invention consists in attaching to lawn-mowers an apparatus for the purpose of gathering the grass as it is cut from the lawn, and then dumping or depositing the same in a pile at any desirable point, as hereinafter more fully shown and described.

In the drawings, A A' P B represent an ordinary "Philadelphia" lawn-mower, to which is attached a box, C, which is fastened to the handle of the mower at N by means of a screw, and over the roller P by means of a hook, Q, forming a part of the bottom D. To the rear of the box, and under it, is attached a roller, O, for the purpose of supporting the box upon the ground. A false bottom, E, hinged at R, rests upon the bottom D, and a vertically-swinging door, F, hinged at S, is attached to the rear wall of the box C. The false bottom E and door F are connected by the rods L and M by means of hinged joints. Upon the false bottom E is also attached a plate, V, forming a secondary or supplemental false bottom having a slot, $x$, for the purpose of allowing it to be raised upward past the rod L on its hinges $w\,w$, and to its front edge is attached a rod, Y.

In the front of the box C, and as near as possible to the knives of the mower, is placed a cylindrical brush, H, and to one end of its shaft is attached a pulley, J. To the outside of one wheel of the mower is firmly attached a pulley, I, and said pulleys I and J are connected by a belt, $k$.

Within the box C and above the brush H, and so as to come in contact with said brush, is fixed a stationary cleaner, T, consisting of either a rod, brush, or comb, and over the box C is placed a cover, G, preferably of canvas, and secured to the box by means of the buttons $n$ on its sides.

The stationary cleaner T is not absolutely necessary for the satisfactory working of the machinery, but in practice I prefer to use it.

The box C may be constructed of either wood or metal, or both, or of a wood or metal frame, covered with either sheet metal, canvas, or any other suitable material.

The cover G is preferably made of canvas, constructed with holes so that it may be attached as described.

The operation of said attachment is as follows, viz: As the lawn-mower proper is drawn or pushed over the lawn motion is communicated to the pulley I, which, by means of the belt $k$, communicates motion to the pulley J, thereby causing the brush H to revolve and brush away the grass, as it is thrown back against it by the knives of the mower, and cause it to fall upon the false bottom V. As the grass accumulates upon the plate V it may from time to time be thrown back upon the plate E by pulling the rod Y backward until the box is quite full. When the box C is full the operator seizes the rod L by its handle and pulls backward, thus raising, in one operation, the false bottoms E and V and door F into the position as shown in Fig. 1, which will cause the grass so gathered to fall out at any desired place.

The stationary or cleaning brush T is placed in close contact with the revolving brush H, to prevent the cut grass from again being carried forward into the cutting-knives.

Having thus described my invention, what I claim as new, and desire to secure by Letters Patent, is—

1. In combination with a lawn-mower, a box or grass-gathering chamber, C, provided with a hinged or false bottom, E, and door F, and operated by the rods L and M, substantially as and for the purpose herein shown and described.

2. In combination with a lawn-mower, a grass-gathering chamber provided with a revolving brush, H, and dumping apparatus E F L M, all combined and operated substantially as and for the purpose as herein shown and described.

3. In combination with a lawn-mower, a grass-gathering chamber provided with a revolving brush, H, stationary brush T, and dumping apparatus E F L M, all combined and operated substantially as and for the purpose herein shown and described.

4. The hinged plate V, provided with a rod, Y, attached to and operated with the hinged bottom E of a grass-gathering attachment to lawn-mowers, constructed substantially as and for the purpose herein shown and described.

JOHN JENKINS.

Witnesses:
WM. ZIMMERMAN,
FRED. G. ZIMMERMAN.